Figure 1:
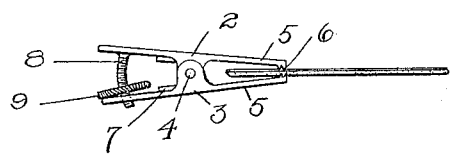

J. L. SCHEU.
TIE CLASP.
APPLICATION FILED DEC. 29, 1913.

1,139,585.

Patented May 18, 1915.

WITNESSES:
H. G. Post
J. B. Gardner

INVENTOR.
JOHN L. SCHEU
BY Miller & White
his ATTORNEYS.

UNITED STATES PATENT OFFICE.

JOHN L. SCHEU, OF SUSANVILLE, CALIFORNIA.

TIE-CLASP.

1,139,585.  Specification of Letters Patent.  Patented May 18, 1915.

Application filed December 29, 1913. Serial No. 809,150.

*To all whom it may concern:*

Be it known that I, JOHN L. SCHEU, a citizen of the United States, and a resident of Susanville, Lassen county, State of California, have invented certain new and useful Improvements in Tie-Clasps, of which the following is a specification.

The invention relates to tie clasps or scarf holders which are used for holding the ends of a tie or scarf in position.

The object of the invention is to provide a tie clasp in which the jaws may be locked against opening movement.

Another object of the invention is to provide means for preventing the further opening of the jaws regardless of the thickness of material therebetween.

The invention possesses other advantageous features, which, with the foregoing, will be set forth at length in the following description, where I shall outline in full that form of the invention which I have selected for illustration in the drawings accompanying and forming part of the present specification. The novelty of the invention will be included in the claims succeeding said description. From this it will be apparent that I do not limit myself to the showing made by said drawings and description as I may adopt many variations within the scope of my invention as set forth in said claims.

Figure 2:
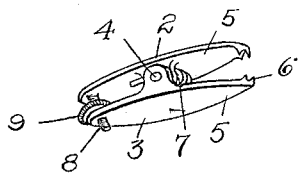

Referring to said drawings: Figure 1 is a side view of the clasp, showing a strip of fabric between the jaws and the jaws locked against opening. Fig. 2 is a perspective view of the clasp, showing the jaws separated.

The clasp consists of two members 2—3, hinged together intermediate between their ends by a pin 4. The forward ends of the members or the jaws 5 are preferably provided with teeth or serrations 6, so that a more firm grip on the fabric is obtained. Arranged between the two members are means, preferably in the form of a coiled spring 7, surrounding the pin 4 and pressing against the members on that side of the pin remote from the jaws, for yieldingly pressing the jaws together.

Arranged between the members at that side of the pin remote from the jaws are means for locking the jaws against further opening movement regardless of the position of the jaws. This means preferably consists of a screw threaded member 8 attached to one member and passing through an aperture in the other member, on which is arranged, between the members, a nut 9 which is preferably circular in form and which projects beyond the edge of the members so that it may be readily rotated. The screw 8 is preferably formed concentric with the pin 4 so that the aperture in the member through which it passes may be circular. After a tie or other fabric has been gripped by the jaws, by virtue of the spring 7, the nut is rotated until it engages the apertured jaw, thereby preventing the opening of the jaws.

I claim:

A tie clasp comprising two members pivoted together between their ends, jaws formed on one end of said members, a spring arranged between said members adapted to press the jaws together, a screw threaded member concentric with said pivot secured to the opposite end of one of said members, the other member being provided with a circular aperture through which said threaded member passes, and a nut on said screw-threaded member for engaging the inner face of said apertured member to lock said jaws against opening movement.

In testimony whereof, I have hereunto set my hand at San Francisco, California, this 16th day of December 1913.

JOHN L. SCHEU.

In presence of—
 H. G. PROST,
 J. B. GARDNER.

Copies of this patent may be obtained for five cents each, by addressing the "Commissioner of Patents. Washington, D. C."